United States Patent
Risch et al.

(10) Patent No.: US 6,799,812 B2
(45) Date of Patent: Oct. 5, 2004

(54) INTEGRATED PRESSURE SENSOR MODULE

(75) Inventors: Stephan Risch, Weiterstadt (DE); Michael Jürgens, Wölfersheim (DE)

(73) Assignee: Continental Teves AG & Co. OHG, Frankfurt (DE)

(*) Notice: Subject to any disclaimer, the term of this patent is extended or adjusted under 35 U.S.C. 154(b) by 0 days.

(21) Appl. No.: 10/275,411

(22) PCT Filed: May 8, 2001

(86) PCT No.: PCT/EP01/05206

§ 371 (c)(1),
(2), (4) Date: Nov. 4, 2002

(87) PCT Pub. No.: WO01/85511

PCT Pub. Date: Nov. 15, 2001

(65) Prior Publication Data

US 2003/0090147 A1 May 15, 2003

(30) Foreign Application Priority Data

| May 11, 2000 | (DE) | .......................... 100 22 911 |
| Dec. 13, 2000 | (DE) | .......................... 100 62 051 |
| Jan. 16, 2001 | (DE) | .......................... 101 01 928 |
| Feb. 21, 2001 | (DE) | .......................... 101 08 374 |

(51) Int. Cl.$^7$ .............................................. B60T 8/36
(52) U.S. Cl. ..................... 303/119.2; 303/119.3; 303/116.4; 303/DIG. 4
(58) Field of Search .................. 303/DIG. 3, DIG. 4, 303/116.4, 115.2, 119.3, DIG. 10

(56) References Cited

U.S. PATENT DOCUMENTS

| 5,820,228 A | * 10/1998 | Schneider et al. | ........ 303/119.3 |
| 6,007,162 A | * 12/1999 | Hinz et al. | ................ 303/119.3 |
| 6,059,381 A |   5/2000 | Bayer | |
| 6,347,845 B1 | *  2/2002 | Engfer et al. | ............ 303/119.3 |
| 6,439,673 B2 | *  8/2002 | Anderson | ................ 303/119.3 |

FOREIGN PATENT DOCUMENTS

| DE | 3919760 | 12/1990 |
| WO | 9633081 | 10/1996 |
| WO | 0002755 |  1/2000 |
| WO | 0017025 |  3/2000 |
| WO | 0063665 | 10/2000 |
| WO | 0160669 |  8/2001 |

* cited by examiner

*Primary Examiner*—Matthew C. Graham
(74) *Attorney, Agent, or Firm*—Honigman, Miller, Schwartz and Cohn LLP

(57) ABSTRACT

The present invention discloses a braking device comprising an assembled control mechanism wherein a first plug-in housing unit essentially containing the electronic components on one or more component support members, is plugged together with a block-shaped solid part on a first surface of the solid part for establishing a magnetic and electrical connection, with said solid part including magnetically operated hydraulic valves for the actuation of the brakes and hydraulic lines, and wherein the device comprises pressure sensors for measuring the pressure in the hydraulic lines at appropriate measuring points. The braking device is characterized in that the pressure sensor(s) is/are integrated in the assembled control mechanism.

20 Claims, 8 Drawing Sheets

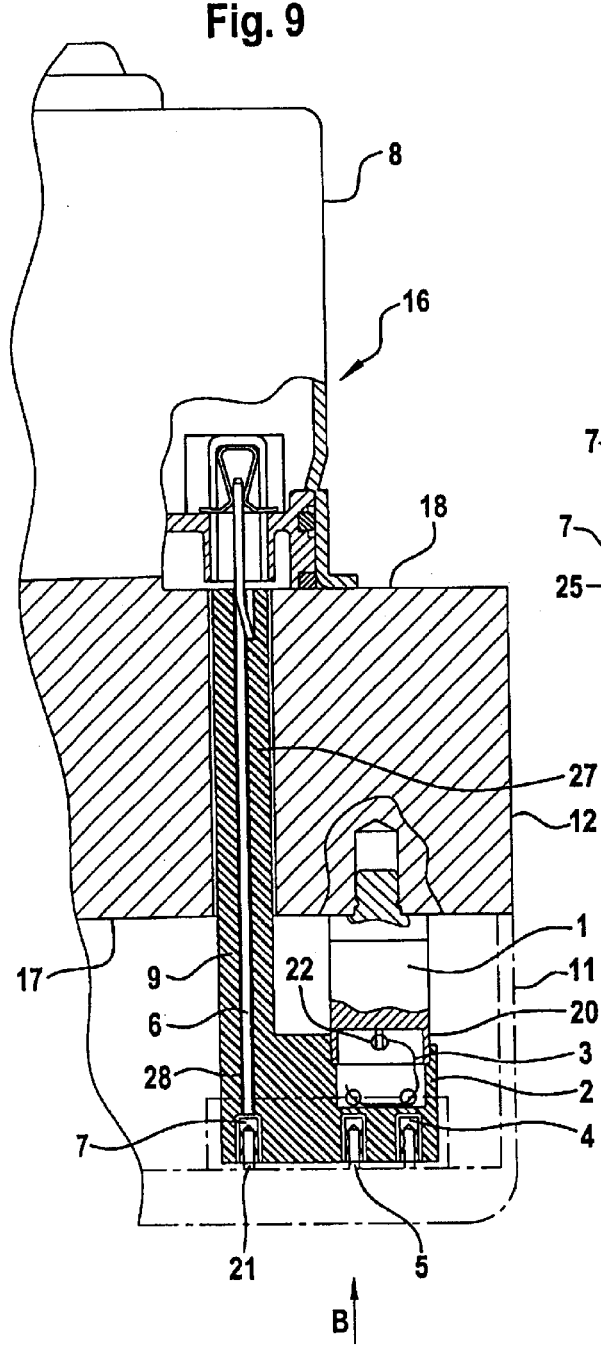
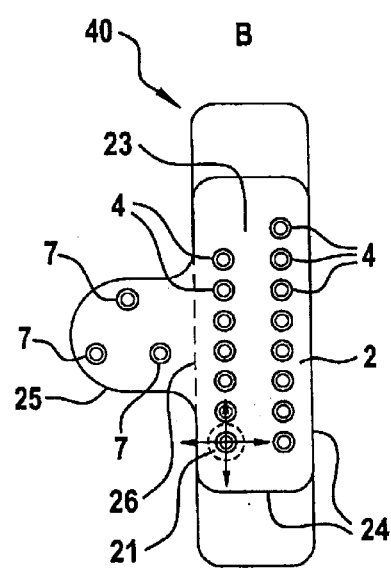

Fig. 12b
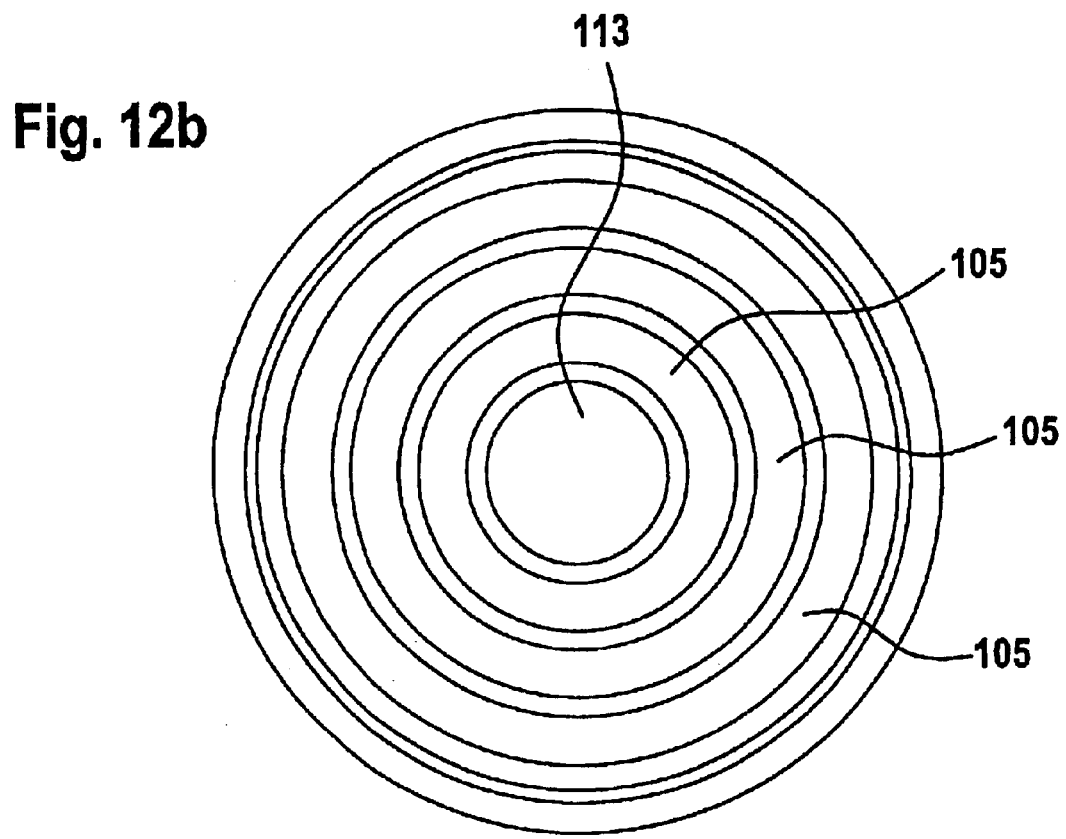
Fig. 15  a)   b)
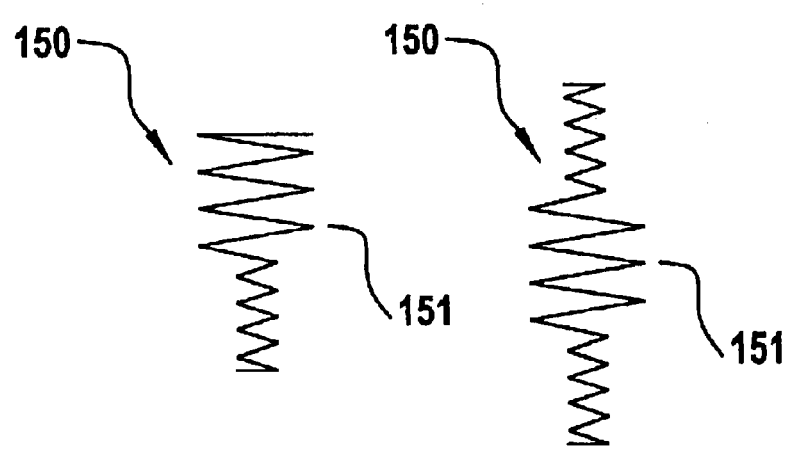

INTEGRATED PRESSURE SENSOR MODULE

TECHNICAL FIELD

The present invention generally relate to control mechanisms, and more particularly relates to electro-hydraulic pressure control mechanisms having integral pressure sensors.

BACKGROUND OF THE INVENTION

Modern hydraulic or electrohydraulic brake systems for motor vehicles are equipped with electronically controlled devices for controlling the hydraulics (control mechanisms). The electronic control devices permit the adjustment of brake force at the wheels by pressure increase or reduction in the hydraulic lines that lead to the brake cylinders in dependence on sensors for the purpose of measuring the driving condition.

On the one hand, there are known control mechanisms with a control for avoiding or reducing undesirable wheel slip (e.g. ABS) as well as extended more complex systems for driving dynamics control which are able to actively build up brake pressure at determined wheels in critical driving situations (ESP, TCS). In the course of the general miniaturization and cost reduction, the above-mentioned control mechanisms for brakes have become smaller and compacter in recent times.

Control mechanisms (integrated controllers) of this type are basically comprised of two function blocks: a hydraulic control unit (valve block, HCU) with the hydraulic valves and an electronic unit (ECU) that comprises the overall electronic system such as electromagnetic coils, power semiconductors, and microcontrollers. Depending on the operating mode of the brake, the hydraulic pressure buildup occurs either in the master cylinder that is connected to a brake pedal, or by means of a pump motor which is arranged on the side opposite the electronic controller.

As stated above, the control mechanisms comprise two housing units being assembled during manufacture. The electronic controller comprises the total electronic system of the control mechanism such as electromagnetic coils for actuating the valves, electrical contacts, power semiconductors and microcontrollers, generally, on one single circuit board. Once the controller housing and the valve block are assembled, the valve coils and the valves reside in close proximity and all necessary electrical contacts are made between the valve block and the printed circuit board (principle of the magnetic plug).

In some design variants the electric feed lines, by way of a rod-shaped motor plug, are passed through a bore in the hydraulic part of the control mechanism. The latter motor plug projects from the hydraulic block when the magnetic plug is assembled, so that contacting of the hydraulic motor can also occur during the assembly of the magnetic plug.

It has shown that additional pressure information is required from the hydraulic part of the control mechanism to meet the various control tasks existing in more recent improved brake control mechanisms. This applies equally to current electronic brake systems with a purely hydraulic transmission of the brake pressure as well as for future brake systems wherein the required brake force is generally transmitted to the brake actuators (e.g. control mechanism with pressure accumulator) in an electric way (electrohydraulic brake (EHB) or brake systems with active hydraulic brake force assistance (OHBV (OHB—Optimized Hydraulic Brake)).

In conventional hydraulic brake systems on which the present invention is based, it is known to measure the pressure of the hydraulic fluid outside the integrated control mechanism, e.g. in the area of the tandem master cylinder (TMC). It is usual that the pressure sensor is connected to the tandem master cylinder by a screw coupling for this purpose.

BRIEF SUMMARY OF THE INVENTION

An object of the present invention is to disclose a braking device which, compared to prior art braking devices, is equipped with an apparatus for pressure measurement without departing from the objective of achieving a compact type of construction and low-cost manufacture. The most important aspect in this respect is the constructive extension of the functionality of an already existing highly integrated control mechanism by exploiting a small mounting space available.

This object is achieved by the device comprising an assembled control mechanism wherein a first plug-in housing unit essentially containing the electronic components on one or more component carriers, is plugged together with a block-shaped solid part at a first surface of the solid part for establishing a magnetic and electrical connection, with said solid part including magnetically operated hydraulic valves for the actuation of the brakes and hydraulic lines, and with said device comprising pressure sensors for measuring the pressure in the hydraulic lines at appropriate measuring points, wherein the pressure sensor(s) is/are integrated in the assembled control mechanism.

The present invention discloses a device which permits achieving a more straightforward, more robust, less expensive and also reliable connection of pressure sensors to the hydraulic unit and, in addition, provides a possibility of tolerance compensation during the assembly of the controller housing and the valve block, as will be described in detail in the following.

According to the solution illustrated in FIGS. 1 to 6, the pressure sensor 19 is mechanically and hydraulically coupled to the valve block 12 by way of a bore in the valve block, e.g. by means of a clinched engagement. On a side of the pressure sensor facing the housing of the electronic controller 11, the said sensor has an electrical contact with spring elements in order to provide a slidable contact after the valve block and the controller have been joined. After the controller and the valve block have been assembled, the pressure sensor passes through the controller housing and, thus, is completely integrated in the control mechanism (FIGS. 2, 5, and 6).

During manufacture of the control mechanism, the pressure sensor and the pump motor are mounted on the valve block 12 before the controller and the valve block are joined. The problem encountered in manufacture with respect to the general manufacturing tolerances that have to be taken into consideration is that the position of the pressure sensor, especially the position of the bore provided for this in the valve block is generally determined already prior to the plug-in operation of controller and valve block. In addition, it must be taken into account that during the plug-in action according to the embodiment illustrated in FIG. 6, the electrical contact of the pump motor—apart from the electrical contact of the pressure sensor—is established by way of a rod-shaped motor adapter 9 that projects from the valve block. It is important that all male elements of the electric plugs will exactly mate with the plug's female elements during the plug-in action. However, this is not easy to fulfill for the pressure sensor contacts 13 and the motor contacts due to the existing tolerances. When first the rod-shaped motor plug engages a mating tubular guide in the controller housing in the assembly operation of controller housing and valve block, the relative positioning of the controller housing and the valve block is defined by the position of the motor plug. Due to this fixation, existing tolerances cause the plug contacts of the sensor to have a position that is not accurately determined.

The above-mentioned tolerances, which occur in each case in the assembly of the controller housing accommodating the electronics and the hydraulic valve block, may accumulate locally in an unfavorable way, especially during the step of assembling the valve block and the controller housing. Contacting of an actuator or sensor arranged on the hydraulic block with the printed circuit board in the controller housing, with the plug mechanism maintained, is impaired or prevented due to the tolerances developing.

In a favorable embodiment of the present invention, the above problem is solved by providing a contact zone between the sensor and the printed circuit board, with said zone rendering it possible to compensate tolerances by using slidable contact elements. These elements may e.g. be springs or bushes displaceable in recesses. Advantageously, this permits broadening the tolerance limits in preceding steps of manufacture. The indicated contact zones allow tolerance compensation perpendicular to the surface 17 of the valve block and in parallel thereto. In addition, tolerance compensation allowing a rotation about the longitudinal axis of the pressure sensor to a certain extent is favorably provided.

In another favorable embodiment, the pressure sensor is structurally united with the motor contacting element in order to overcome the problem of tolerances. The advantage of combining the electrical contacts of the pressure sensor(s) involves a more reliable electrical contacting and, in addition, a simplified manufacture.

Besides, the plug-in housing unit with the electronic components permits greater ease of packing and transport. This construction is advantageous, among other things, because it obviates the need for an adapter guide 10, 32 (see FIGS. 2 and 6) provided in per se known electronic housing units.

Still another favorable embodiment discloses an improved seal-tightness of the pressure sensor with respect to moisture, likewise permitting tolerance compensation in the described fashion.

The advantage of integrating the pressure sensor into the brake control mechanism according to the invention is that the pressure sensor is also encompassed by the housing of the electronic controller so that it is protected against environmental influences to a much better degree than a pressure sensor that is arranged externally, e.g. on the tandem master cylinder. Another advantage is that the integration of one or more pressure sensors in the control mechanism renders additional cable harnesses unnecessary.

BRIEF DESCRIPTION OF THE DRAWINGS

FIG. 9 is a cross-section taken through a control mechanism with a pressure sensor module that is united with a motor adapter, with an adapter plug attached to an oblong plug for pressure sensor contacts.

FIG. 10 is a top plan view of the assembled plug of FIG. 9 with pressure sensor contacts and motor contacts.

FIG. 15 shows two examples for stopped contact elements.

DETAILED DESCRIPTION OF THE PREFERRED EMBODIMENTS

Figure 1:
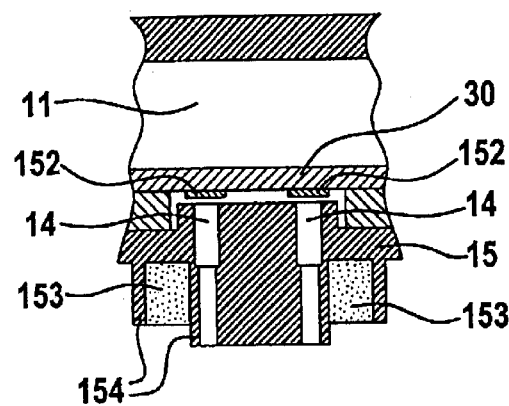
FIG. 1 shows a cross-section taken through a contact zone between the pressure sensor and the support member of electronic components.
Figure 2:
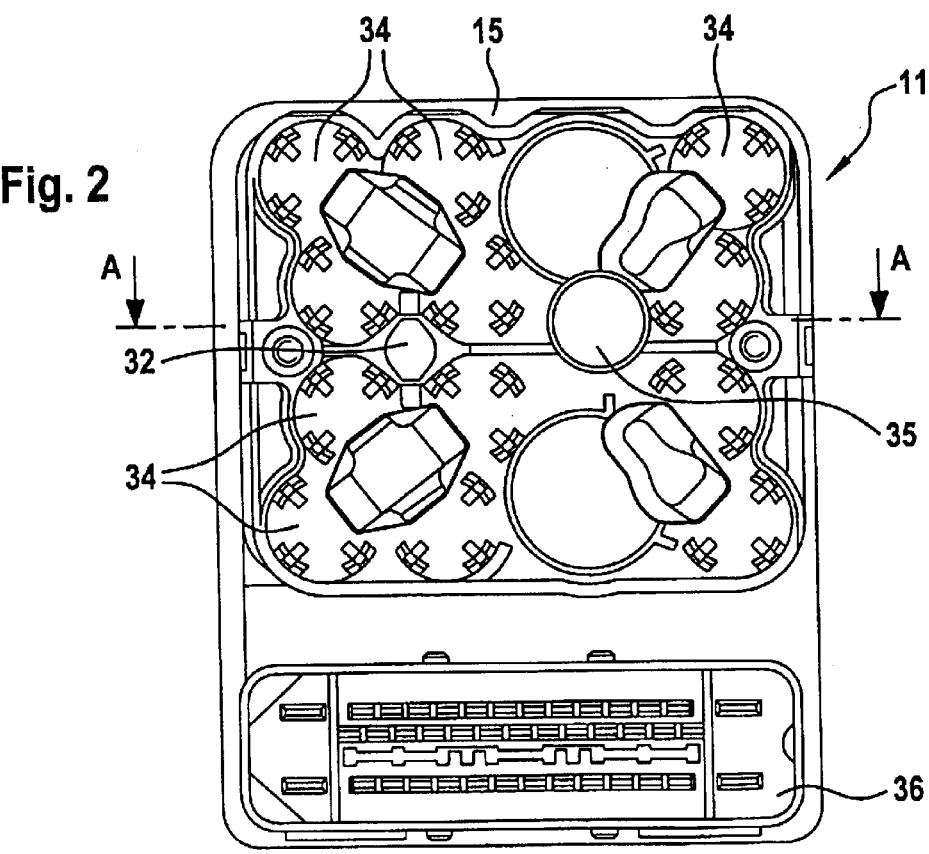
FIG. 2 is a top plan view of the housing of an electronic controller.
Figure 3:
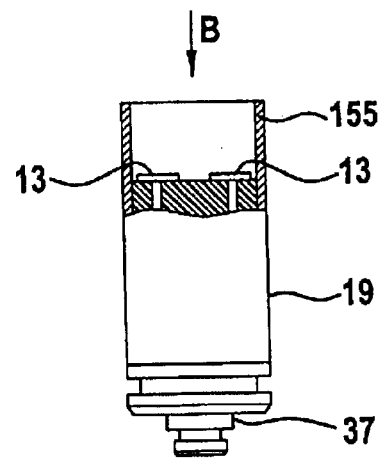
FIG. 3 is a side view of a single pressure sensor.
Figure 4:
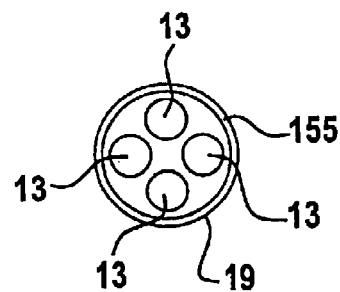
FIG. 4 is a top plan view of the pressure sensor of FIG. 3.
Figure 5:
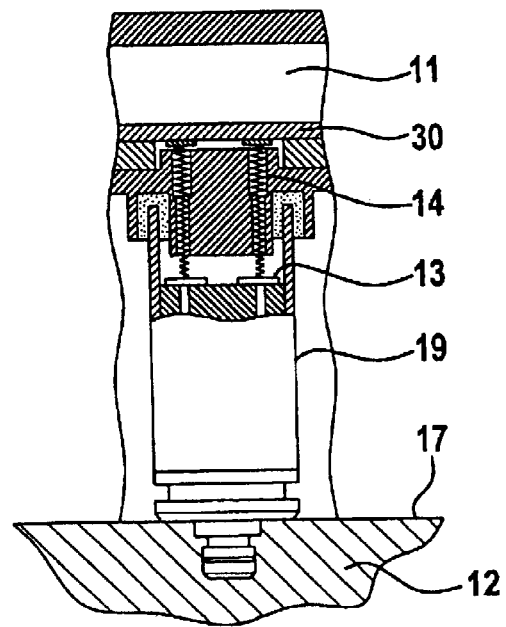
FIG. 5 shows a single pressure sensor of FIG. 3 after the controller housing and the valve block have been assembled.
Figure 6:
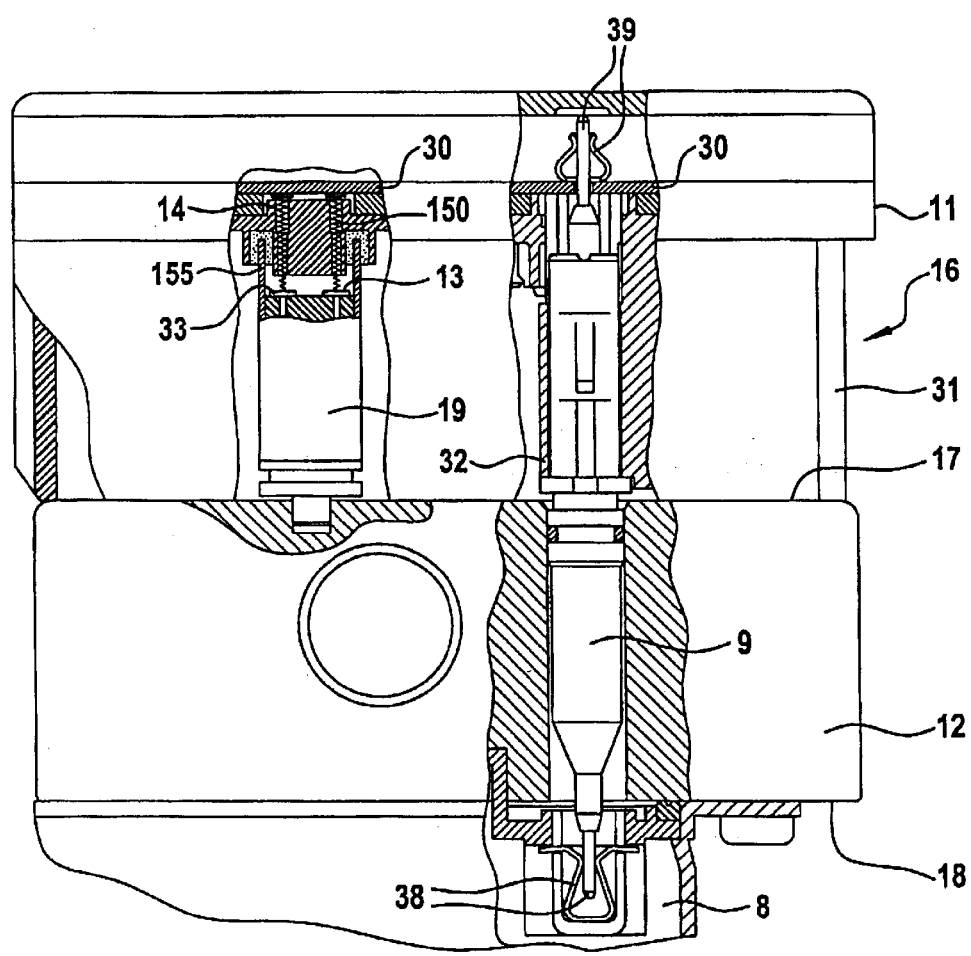
FIG. 6 is a side view, partly in cross-section, of a control mechanism with a sensor according to FIG. 3 and a motor adapter.

As shown in the example in FIGS. 1 to 6, pressure sensor 19 is mechanically and hydraulically connected to valve block 12 by way of a bore in the valve block, e.g. by means of a clinched engagement. On a side of the pressure sensor close to controller 11, said pressure sensor is in electrical contact with spring elements to provide a contact after the valve block and the controller have been assembled. After the assembly of the controller and the valve block, the pressure sensor is guided by the controller housing and, thus, fully integrated in the control mechanism (FIGS. 2, 5, and 6).

During manufacture of the control mechanism, the pressure sensor and the pump motor are mounted on the valve block 12 fashion before the controller and the valve block are assembled. The electrical contact of the pump motor is established in the plug-in action by way of a rod-shaped motor adapter 9 (FIG. 6) projecting from the valve block in addition to the assembling of the coils. In particular during automatic manufacture, it is important that all male elements of the electric plug mate exactly with the female elements of the plugs during the plug-in operation. Due to the existing tolerances, this cannot be achieved for the pressure sensor contacts 13 and the motor contacts without taking special measures, as explained hereinabove. When the rod-shaped motor plug first engages a mating tubular guide in the controller housing in the assembly of controller housing and valve block, the relative positioning of the controller housing and the valve block is defined by the position of the motor plug. To compensate tolerances, a displaceable contact zone with displaceable sensor contacts 33 and a displaceable sealing arrangement is provided by the present invention.

The electrical contact of the pressure sensor 19 (FIG. 6) with the printed circuit board 30 is illustrated in FIG. 1. Contact surfaces 152 which make an electrical contact with spring elements (not shown) in recesses 14 are arranged on the printed circuit board that is attached in the plastic housing 15 of the electronic controller 11. The said recesses are bores in the plastic housing of the controller, said bores having a step so that the stepped spring elements of FIG. 15 can be introduced into the bores prior to the final assembly.

Preferably, one-step spring elements are used according to FIG. 15a) that are oriented especially in such a fashion that the slim end of the spring points in the direction of the sensor or actuator.

Sealing means 153 are provided in the housing of the controller on a double collar 154 filled with a sealing material according to a preferred embodiment of this invention.

The double collar comprises two walls with a circumferential trough-shaped indentation, with preferably the inside wall that suitably also accommodates the springs being raised compared to the outside wall, with the result that a protection of the contact elements against the ingress of sealing compounds during the assembly is favorably achieved. The sealing material especially is silicone caoutchouc, e.g. Silgel® of Messrs. Wacker Chemie, which can be injected into the double collar. After injection of the sealing material, a housing collar 155 of the pressure sensor will then plunge into the gel during assembly of the pressure sensor, thereby achieving a reliable sealing. Apart from the gel described before, a setting or thermoplastic adhesive may also be appropriate as a sealing material, however, an elastomeric such as silicone or SilGel® is preferred.

The double collar described above is capable of compensating the said tolerances in parallel to surface 17 and perpendicular thereto, as well as the rotatory tolerances about the longitudinal axis of the pressure sensor.

The housing of the electronic controller 11 in the non-assembled condition is shown in a top plan view in FIG. 2. The housing is favorably made of plastics, but it may also consist of any metal material, either wholly or in part, if a higher heat emission to the ambient space is necessary. In addition, the housing includes shaped coil accommodations 34, a shaped pressure sensor accommodation 35, and an electric plug 36 for the controller's connections.

Pressure sensor 19 is shown in a side view in FIG. 3. The bottom end of the pressure sensor is pressure-tightly connectable to a hydraulic pressure sensor port at valve block 12 (FIG. 6). Plate-shaped conductive contact surfaces 13 are disposed at the top end of the pressure sensor, said surfaces being pressed against the spring contacts on the printed circuit board in the assembly of controller and valve block. The result of the springs contacting the contact surfaces is an electrical connection of the pressure sensor to the printed circuit board that is suitable to compensate the assembly tolerances mentioned hereinabove.

FIG. 4 shows the top end of the pressure sensor of FIG. 3. Four circular contact surfaces 13 are arranged on a circular surface of the sensor.

The pressure sensor of FIGS. 3 and 4 is shown after the assembly of electronic controller 11 and valve block 12 in FIG. 5. Spring elements 150 are in contact with the contact surfaces 13 after the controller and the valve block have been assembled.

FIG. 6 shows a side view of an assembled control mechanism 16. The pump motor 8 is screwed to a surface 18 of the valve block 12. To lead the electric connectors of the motor to the printed circuit board 30, a motor adapter 9 is provided and projects through a bore of the valve block into a guide towards the printed circuit board 30 fastened to the housing 31. The electric conductor provided in the motor adapter is connected to the motor by way of a contact element 38 and to the printed circuit board by way of another contact element 39.

Figure 7:
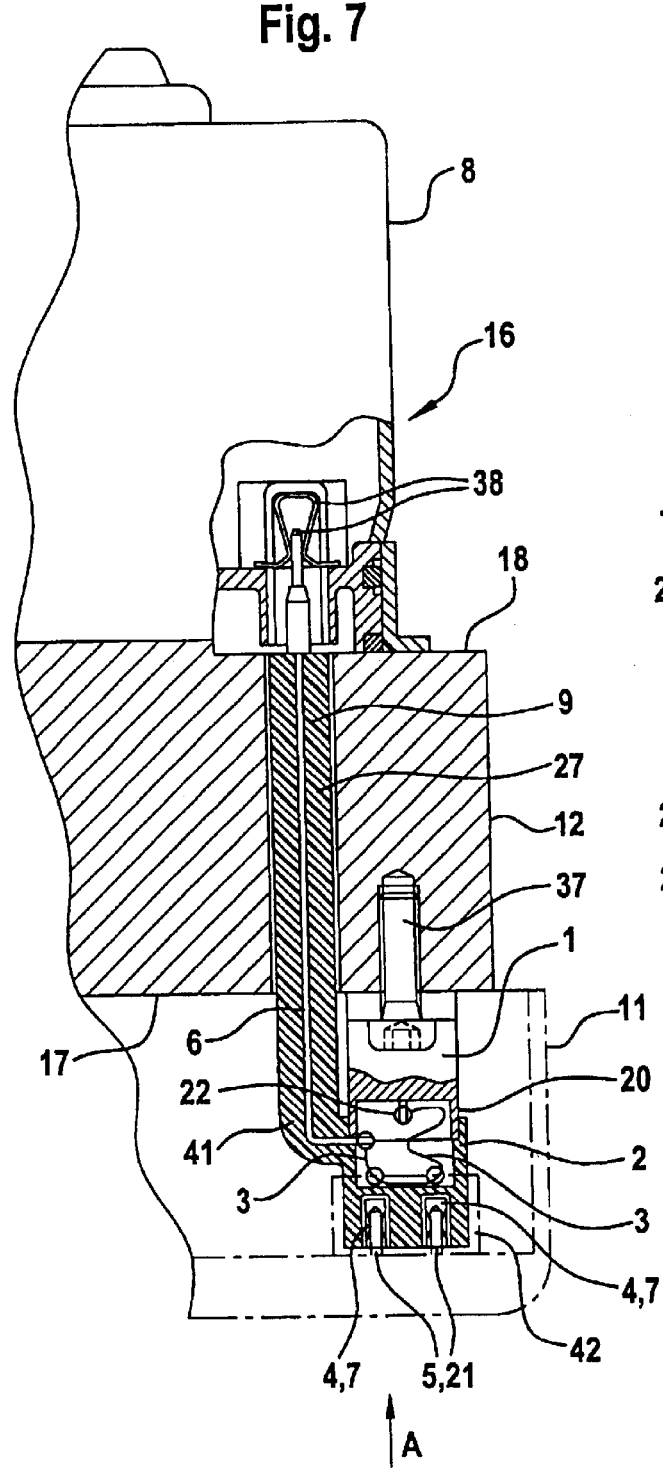
FIG. 7 is a cross-section taken through a motor adapter combined with a pressure sensor module and a joint oblong plug.

FIG. 7 is a partial view of a control mechanism with an invention combination of a pressure sensor contact zone and a motor adapter. In contrast to FIG. 6, the Figure is turned by 180° with regard to the position of motor and controller. Motor 8 is fitted to surface 18 of the valve block 12 like in FIG. 6. The electric motor feed line 6 extends in the motor adapter 9 likewise leading through the valve block. The motor feed line 6 is insulated relative to the valve block by a mechanically stable insulation material 27 that is preferably a plastic material.

Figure 8:
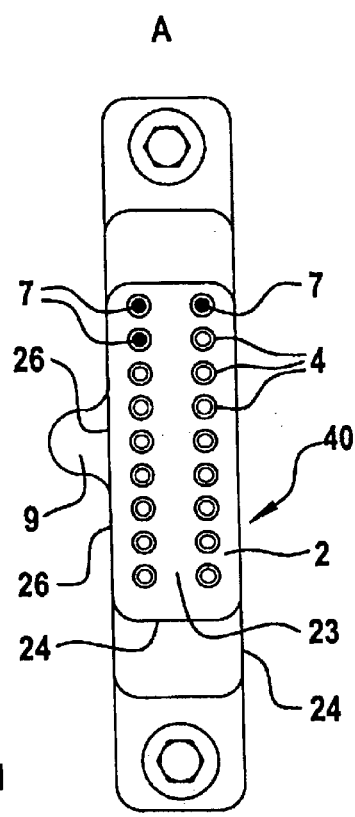
FIG. 8 is a top plan view of the joint oblong plug of the motor adapter of FIG. 7 connected to the pressure sensor module.

In the example illustrated in FIG. 7, several pressure sensors are combined in a module in the pressure sensor module housing 1 for measuring the hydraulic pressure at the line to the brake pedal and/or the pressure in the lines to the brakes. The hydraulic connection of the pressure sensors to the valve block is by way of hydraulic pressure sensor ports 37 at surface 17 of the valve block. The side of the module housing 1 close to the controller comprises a raised module housing wall 20 through which grips a suitably shaped cover element of the sleeve casing 2 that is positively connected to the motor adapter 9. A recess is formed thereby. The sleeve casing is operatively connected to the sensor module, e.g. by catch-type or screw-type coupling, etc. The electrical contacts of the pressure sensors lead into the recess provided by the wall 20 and the sleeve casing 2. In this recess, the sensor element contacts 22 are connected to connector terminal sleeves 4 by way of a flexible conductor 3 (wires or, favorably, a flexible foil coated with conductor tracks), which are arranged in the plastic sleeve casing 2. The flexible foil is coated with conductor tracks for establishing the corresponding electrical connections. The plastic sleeve casing 2 is shaped at the rear side of an oblong sensor contact plug 40 (FIG. 8). The insulation of the motor adapter 9 is formed at the lateral surface 26 (FIG. 8) of housing 2 by way of a curvature 41. The feed line 6 of the motor is thereby passed into the housing 2, with the result that a joint plug-in operation of the electrical connector of the motor as well as the electrical connector of the pressure sensors is enabled by way of the flexible conductor 3 and mating motor connector terminal sleeves 7.

FIG. 8 shows a top plan view of the sensor contact plug 40. The sensor connector terminal sleeves 4 and motor connector terminal sleeves 7 are jointly arranged in two rows in a screen 23. When controller and valve block are assembled, the plug 40 enters a female receptacle 42 of the controller housing, wherein the contact pins 5 (sensor) and 21 (motor) are mounted in an operatively engaged and conductive manner, e.g. by means of a per se known pressing technique (FIG. 7).

FIG. 9 shows another example of the invention for a motor adapter 9 connected to a pressure sensor module 1. FIG. 10 shows the associated sensor contact plug 40'. In contrast to the embodiment in FIGS. 7 and 8, the motor connector terminal sleeves 7 are not arranged in the two-row screen 23, which exclusively comprises sensor connector terminal sleeves 4 in this case. Rather, the motor connector terminal sleeves 7 extend in a circular area 25 being formed at a side wall 26 of the plastic sleeve casing 2.

The flexible conductor 3 connects in this example exclusively the sensor element contacts to the sensor connector terminal sleeves 7. The motor feed line 6 is fixed directly to the motor connector terminal sleeves 7.

In the per se known embodiment of FIGS. 1 to 6, as has been explained already hereinabove, the tolerance compensation is effected by the arrangement with spring elements and contact surfaces. Tolerance compensation is also provided in the embodiments of FIGS. 7 to 10.

To this end, the conductor 6 is designed as a rigid metal rod in the insulation 27 of the motor adapter 9 in FIG. 9, with the said rod being e.g. a steel wire or a flat metal strip extending with oversize in a recess of the adapter. Likewise the connector terminal sleeve 7 connected to the conductor 6 by form-lock is guided in a recess with oversize in the plastic sleeve casing. This allows a certain freedom of motion in an area 21 in the plane parallel to the surface 17 in plug 40', rendering tolerance compensation possible.

The connector terminal sleeves of the sensor elements 4 may also have a clearance in the plastic sleeve casing. The sleeves of the sensor are then equally movable freely in a predetermined area due to the contacting by way of a flexible conductor 3.

Another example for an embodiment of the present invention, which is not shown in the Figures, is a pressure sensor module wherein several single pressure sensors according to FIG. 3 are combined in a joint housing, in particular in a matrix. In contrast to the example illustrated in FIG. 7, the housing of the module 1 is not connected to the motor adapter 9 but, similar to the arrangement with a single sensor according to FIG. 6, is arranged at another position on the valve block surface 17. In a like pressure sensor module, preferably the pressure sensor ports 37 are designed as separate outlets from the joint module housing and the electric connectors extend in a poly-pole contact zone with tolerance compensation.

Figure 11:
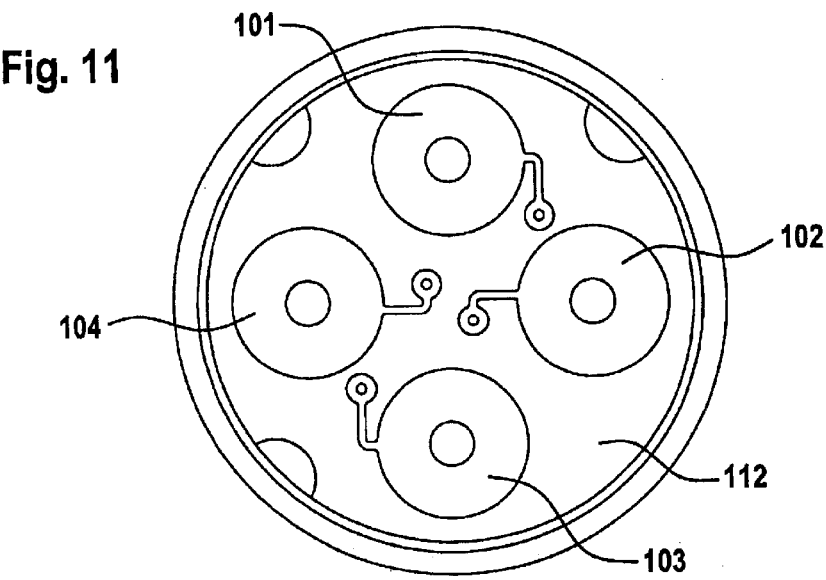
FIG. 11 is an arrangement of contact surfaces of a pressure sensor showing four circular contact surfaces.

An individual pressure sensor is shown in FIG. 11. Said sensor includes four planiform, especially circular contact surfaces. Two of these surfaces may be used for the pressure/ temperature information 101, 102 and the others for connecting a supply voltage 103 and the mass 104. According to the Figure, the contact surfaces are connected electrically to the component support member 111 in the electronic control unit by means of electrically conductive spring elements 110. The surfaces may be metallized or consist of a properly conductive material, especially gold or silver. The surfaces in FIG. 11 are arranged on the circumference of a circle and roughly have the same diameter, with the diameter of the contact surfaces being chosen to be greater than the diameter of the contact elements.

A defined tolerance zone for the pressure sensor, predetermined by the overall system, must be maintained in the construction of the contact zone. In addition, the mounting space used for the contact zone should be smallest possible because sufficient space must remain for the other components such as valve coils, motor contact, etc., on the total surface available. The following examples describe an embodiment favorable in the sense described above.

Figure 12A:
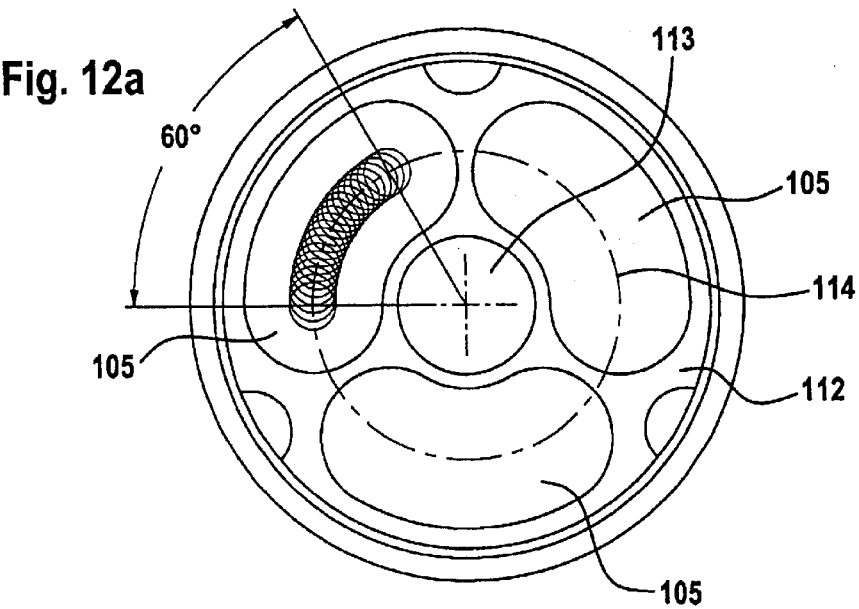
FIG. 12 shows arrangements with oblong contact surfaces.

According to FIGS. 12a and 12b, the contact surfaces arranged on the circle are coaxially arranged on the available circular surface 112.

According to FIG. 12a, the contact surfaces 105, except for the center contact 113, are arranged along a circle 114 in an oblongly curved or reniformly tangential way.

In FIG. 12b, the contact surfaces are concentric area rings isolated from one another.

The arrangement shown in FIG. 12a is especially favorable to compensate tolerances because translatory as well as rotatory tolerances may be compensated. The translatory tolerances that have been mentioned several times before may be caused due to inaccuracies in the positioning of the bores for the connections of the sensor or actuator in the hydraulic unit 119 and in the electronic component support member, but also due to slight level differences when the printed circuit board is mounted into the housing. The main cause of the rotatory tolerances in the automatic manufacture is that angular tolerances may occur with respect to the axis 109 when e.g. a sensor is attached in the hydraulic unit by means of a clinched engagement 8, which is preferred in the present invention.

As mentioned hereinabove, the pressure sensor can be connected to the hydraulic unit by means of a clinched engagement. The term 'clinch' (also clinching) is the comprehensive term for a number of metal forming joining methods that manage without any auxiliary joining elements. A clinched engagement is obtained by a form-lock between at least two joining elements penetrating each other. This is e.g. carried out in connection with indenting or press-fitting, subsequent cold upsetting, eventually followed by flattening, or extruding operations. This coupling method may be applied with tubular and profiled parts in a particularly expedient manner.

Figure 13:
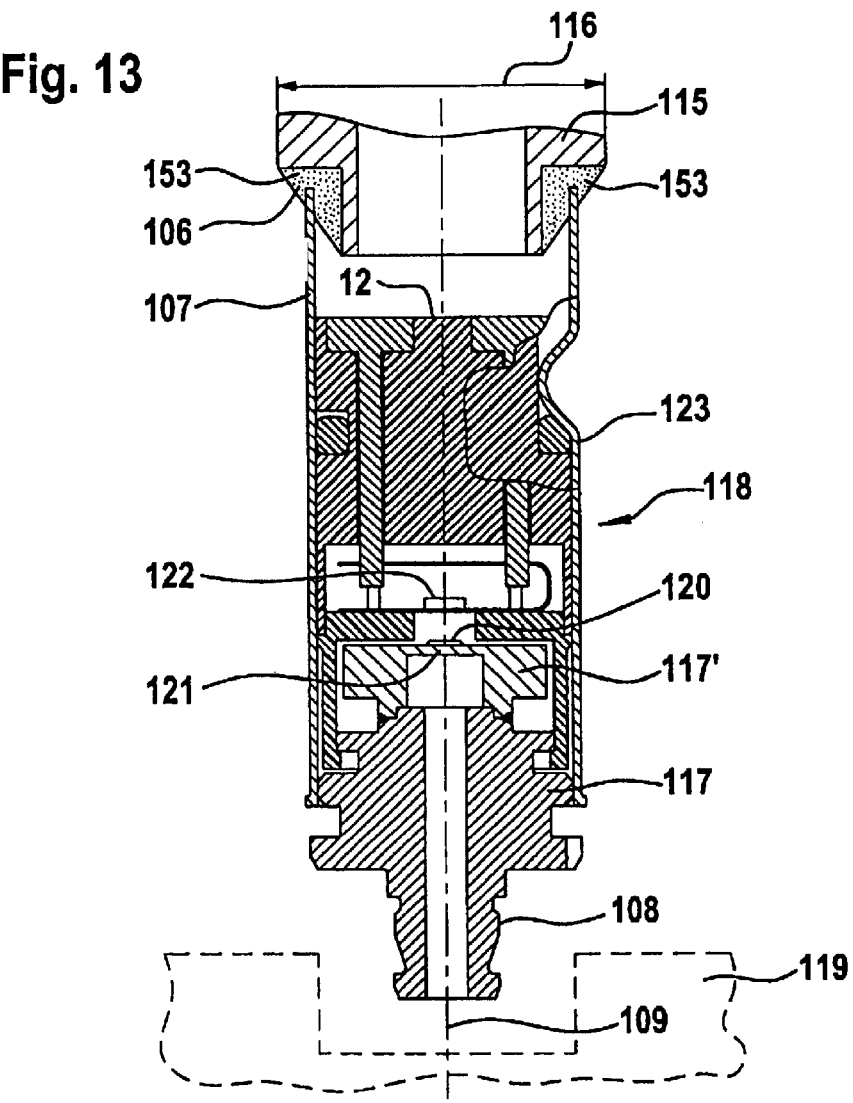
FIG. 13 is a cross-section taken through a pressure sensor with a contact zone sealed by sealing means relative to outside environmental conditions.

FIG. 13 shows a cross-section through a pressure sensor with a contact zone sealed against outside environmental conditions by a sealant 153. A recess in housing 115 is filled with the sealing material described hereinabove for sealing. Thereafter an appropriately shaped housing edge 107 is pressed into the sealing material during the assembly of the pressure sensor. The area of the cone-shaped recess preferably has the shape of rectangular triangle, when viewed in cross-section, so that the hypotenuse of the triangle forms a so-called sealing chamfer. By appropriately choosing the triangular surface, the required tolerance zone can be adapted to the tolerance zone of the contact surfaces. The illustrated seal, which is shaped similar to a cone, permits limiting the mounting space required in the controller housing mainly to the diameter 116 of the sensor in a favorable manner.

FIG. 13 also contains a detailed description of a pressure sensor that may be implemented as disclosed in the invention. A diaphragm 121 is arranged on a diaphragm carrier 117' for the mechanic coupling to the pressure medium. The diaphragm carrier is additionally used as a coupling (e.g. by clinching) to the hydraulic unit. Said carrier may have a bipartite design (117, 117'), but is favorably constructed in one part to the effect of a less expensive manufacture. Further, the diaphragm is equipped with a measuring bridge 120 outputting signals which are further processed by means of an electronics 122.

Figure 14:
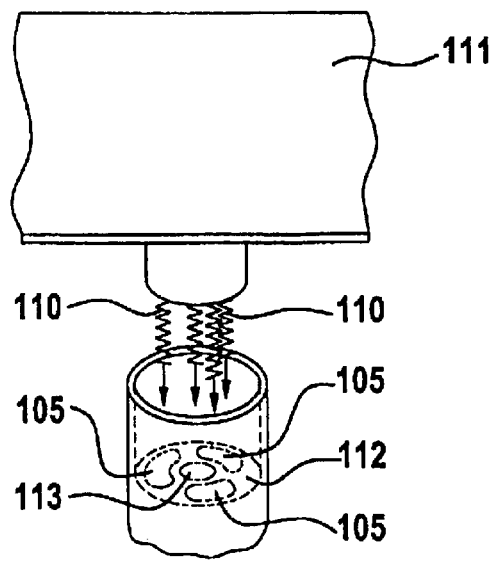
FIG. 14 is a perspective view of the contact zone of FIG. 13.

FIG. 14 shows a schematic view of the assembling operation of a controller housing 111 with a hydraulic unit and the thereby constituted electrical contact of the pressure sensor with the electric component support member.

Examples for elastic contact elements are shown in FIG. 15. Partial picture a) shows a spring 150 having a single step in diameter. The spring in partial picture b) is stepped several times in diameter. The zone with larger diameter 151 allows the spring to be inserted into a stepped bore in the housing of the electronic controller housing 15 (FIG. 1) prior to the final assembly, without the spring falling through the bore.

What is claimed is:

1. Braking device, comprising:
   a first plug-in housing unit containing electronic components on one or more component carriers,
   a block-shaped element plugged into said first plug-in housing unit for establishing a magnetic and electrical connection, wherein said block-shaped element includes magnetically operated hydraulic valves for the actuation of the brakes and hydraulic lines, and a pressure sensor for measuring the pressure in a hydraulic line, wherein the pressure sensor is located in the block-shaped, element, wherein an electrical contact zone of the pressure sensor includes contact elements that are rotatable about a longitudinal axis of the pressure sensor so that a safe electrical contact is achieved with a tolerance-induced displacement of the position of a contact zone of a printed circuit board in relation to the position of the contact zone of the pressure sensor, wherein a conductive connection between a component support member and the pressure sensor is constituted by at least one electrically conductive compressible and elastic contact element, said contact element including at least one radial supporting, step-like projection, and at least one supporting surface provided on said first housing unit or a part connected to the first housing unit for the spatial fixation of the contact element during manufacture of the device.

2. Device as claimed in claim 1, wherein an electrical contact zone of the pressure sensor includes contact elements that are displaceable in parallel to a surface of said pressure sensor so that a safe electrical contact is achieved with a tolerance-induced displacement of the position of the contact zone of a printed circuit board in relation to the position of the contact zone of the pressure sensor.

3. Device as claimed in claim 1, wherein an electrical contact zone of the pressure sensor includes contact elements that are displaceable perpendicular to a surface of said pressure sensor so that a safe electrical contact is achieved with a tolerance-induced displacement of the position of the contact zone of a printed circuit board in relation to the position of the contact zone of the pressure sensor.

4. Device as claimed in claim 3, further including a component support member for constituting an electrical contact by operative engagement with a contact element of said pressure sensor includes a contact surface having a larger planar extension than said pressure sensor contact element.

5. Device as claimed in claim 3, wherein on a first frontal surface of the pressure sensor, the pressure sensor includes an arrangement of contact surfaces isolated from each other, wherein said contact surfaces allow an elastic connection at the sensor to be constituted with elastic contact elements.

6. Device as claimed in claim 5, wherein on the first frontal surface of the pressure sensor, a central contact is arranged in the area of a center of the frontal surface, and wherein at least two oblong peripheral contacts are arranged along circular segments of a circle or along several concentric circles formed around a center of said contact.

7. Device as claimed in claim 3, wherein for sealing the pressure sensor relative to the first housing unit, a sealant is provided including a double collar filled with a sealing material, with a pressure sensor collar residing within said double collar, while a tolerance zone is maintained.

8. Device as claimed in claim 3, said pressure sensor includes two or more pressure sensors combined in a structurally compact module.

9. Braking device as claimed in claim 8, wherein a pump motor is attached to a second surface of the solid element which is arranged opposite the first surface, and further including an electric motor contacting element extending from the first plug-in housing unit through the solid element to the pump motor.

10. Device as claimed in claim 9, wherein the motor contacting element is connected to the housing of the pressure sensor module in a fixed or plug-type fashion.

11. Device as claimed in claim 9, wherein the electrical connections of the motor contacting element and the electrical connections of the pressure sensor module to a component support member occur by way of contact elements guided in a joint area.

12. Device as claimed in claim 11, wherein the contact elements are plug-in connections made up of contact pins and bushes, wherein said pins or bushes are connected to a housing of the motor contacting element, and wherein the plug-in connections are displaceable in a predetermined surface area in parallel to a plane of a first surface of the solid element.

13. Device as claimed in claim 11, wherein the contact elements are arranged in parallel to a plane of a first surface in a screen.

14. Device as claimed in claim 11, wherein the contact elements of the sensor module are arranged in a plane of the first surface in a rectangular area and the contact elements of the pump motor are arranged in a second, circular area, lying outside of the rectangular area, said second area being joined at a side wall of the rectangular area.

15. Device as claimed in claim 9, wherein the motor contacting element comprises one or more electric conductors and an insulation, wherein said electric conductor is guided with a play within the insulation through a recess in the insulation, and said electric conductor including a stiff wire or flat strip.

16. Device as claimed in claim 9, wherein the electric conductor in the motor contacting element is connected in an electrically conductive fashion to motor contact pins or bushes by way of flexible lines or a flexible foil provided with conductor tracks.

17. Device as claimed in claim 1, wherein the contact element is a cylindrical spiral spring which has a stepped diameter.

18. Device as claimed in claim 1, wherein the pressure sensor is attached to a first surface of the block-shaped solid element.

19. Device as claimed in claim 18, wherein the attaching method is a clinched engagement.

20. Braking device, comprising:
a first plug-in housing unit containing electronic components on one or more component carriers,
a block-shaped element plugged into said first plug-in housing unit for establishing a magnetic and electrical connection, wherein said block-shaped element includes magnetically operated hydraulic valves for the actuation of the brakes and hydraulic lines, and a pressure sensor for measuring the pressure in a hydraulic line, wherein the pressure sensor is located in the block-shaped, element,
wherein an electrical contact zone of the pressure sensor includes contact elements that are rotatable about a longitudinal axis of the pressure sensor so that a safe electrical contact is achieved with a tolerance-induced displacement of the position of a contact zone of a printed circuit board in relation to the position of the contact zone of the pressure sensor,
wherein on a first frontal surface of the pressure sensor, the pressure sensor includes an arrangement of contact surfaces isolated from each other, wherein said contact surfaces allow an elastic connection at the sensor to be constituted with elastic contact elements,
wherein on the first frontal surface of the pressure sensor, a central contact is arranged in the area of a center of the frontal surface, and wherein at least two oblong peripheral contacts are arranged along circular segments of a circle or along several concentric circles formed around a center of said contact.

* * * * *